(12) United States Patent
Tsorng et al.

(10) Patent No.: US 11,552,415 B2
(45) Date of Patent: Jan. 10, 2023

(54) RETAINER FOR SECURING A CONNECTION

(71) Applicant: Quanta Computer Inc., Taoyuan (TW)

(72) Inventors: Yaw-Tzorng Tsorng, Taoyuan (TW); Chun-Chen Hsu, Taoyuan (TW); Jen-Jia Liou, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 65 days.

(21) Appl. No.: 17/092,694

(22) Filed: Nov. 9, 2020

(65) Prior Publication Data

US 2022/0029319 A1 Jan. 27, 2022

Related U.S. Application Data

(60) Provisional application No. 63/055,654, filed on Jul. 23, 2020.

(51) Int. Cl.
*H01R 12/51* (2011.01)
*H01R 12/55* (2011.01)

(52) U.S. Cl.
CPC .......... *H01R 12/515* (2013.01); *H01R 12/55* (2013.01); *H01R 2201/02* (2013.01); *H01R 2201/06* (2013.01)

(58) Field of Classification Search
CPC ...... G06F 1/183; G06F 1/185; G06F 2113/16; H05K 3/30; H05K 3/32; H05K 7/02; H05K 7/12; H05K 7/16; H05K 1/0243; H05K 1/119; H05K 2201/037; H05K 2201/0919; H05K 2201/09609; H05K 2201/09618; H05K 2201/10265; H05K 2201/10386; H05K 7/1405; H01R 2201/02; H01R 2201/06; H01R 12/53; H01R 12/55; H01R 12/7011; H01R 12/778; H01R 13/426; H01R 13/508; H01R 13/5812; H01R 13/5816; H01R 13/582; H01R 13/5825; H01R 13/5829; H01R 13/5833; H01R 13/5837; H01R 13/5841; H01R 13/5845; H01R 13/585; H01R 13/59; F16B 21/086; F16B 21/088; H01L 23/32; H02G 15/007
See application file for complete search history.

(56) References Cited

U.S. PATENT DOCUMENTS

| | | | | |
|---|---|---|---|---|
| 9,166,319 B2 * | 10/2015 | Gingrich, III | ....... | H01R 12/771 |
| 9,172,162 B2 * | 10/2015 | Mostoller | ............. | F21V 19/003 |
| 9,414,505 B2 * | 8/2016 | Hung | ...................... | H05K 3/301 |
| 9,437,964 B2 * | 9/2016 | Hwang | ............. | H01R 13/5812 |
| 9,665,137 B2 * | 5/2017 | Chi | ......................... | G06F 1/187 |
| 9,854,673 B2 * | 12/2017 | Yang | ...................... | F16B 5/121 |

(Continued)

*Primary Examiner* — Ross N Gushi
(74) *Attorney, Agent, or Firm* — Nixon Peabody LLP (57) ABSTRACT

A system is disclosed that is configured to secure a connection between a component and at least one wire, such as an antenna, within a computer. The system includes a retainer configured to move between a first position and a second position. The retainer in the first position is configured to secure a connection between at least one connector of the component and the at least one wire within the computer. The retainer in the second position is configured to permit release of the connection between the at least one connector of the component and the at least one wire within the computer, such as by providing access to the connection.

27 Claims, 12 Drawing Sheets

(56) References Cited

U.S. PATENT DOCUMENTS

| | | | |
|---|---|---|---|
| 10,264,694 B1* | 4/2019 | Lin | G06F 1/185 |
| 10,608,355 B2* | 3/2020 | Chen | H01R 12/73 |
| 2009/0185356 A1* | 7/2009 | Liao | H05K 7/142 |
| | | | 361/759 |
| 2010/0033942 A1* | 2/2010 | Yang | H05K 7/1417 |
| | | | 361/809 |
| 2021/0013578 A1* | 1/2021 | Huber | H05K 1/119 |
| 2021/0059067 A1* | 2/2021 | Chang | H01R 13/426 |

\* cited by examiner

RETAINER FOR SECURING A CONNECTION

CROSS-REFERENCE TO RELATED APPLICATION

This application claims priority under 35 U.S.C. § 119 to U.S. Provisional Application No. 63/055,654, titled "MECHANISM FOR SECURING ANTENNA WIRES PLUG," and filed on Jul. 23, 2020. The contents of that application are hereby incorporated by reference in their entirety.

FIELD OF THE INVENTION

The present invention relates to connections within computers, such as wire connections within a computer.

BACKGROUND

The fastening force required to fasten a wire, such as for an antenna of a wireless communication interface or for wireless communications, to a component within a computer is generally low. While this low amount of fastening force is convenient for connecting the wire, it can be inconvenient because the corresponding force to disconnect the wire is generally low. Thus, wires can become disconnected from the desired component within the computer as a result of minor forces.

Figure 1:
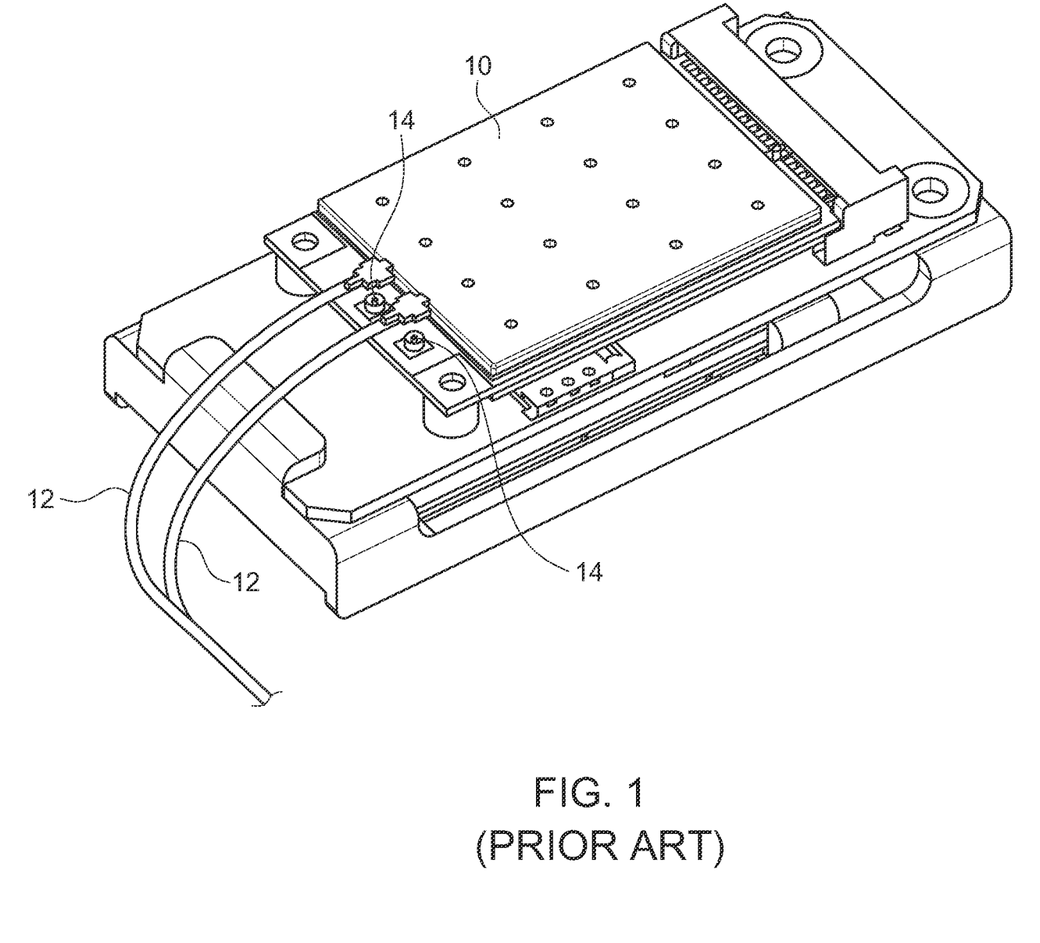
FIG. 1 is perspective view depicting two wires being fastened to a component of a computer.

For example, FIG. 1 is a perspective view depicting a component 10 being connected to two wires 12 within a computer (not shown) through a conventional connection. The two wires 12 releasably connect to respective connectors 14 of the component 10. The connections can be an interference fits. Depending on the strength of the interference fits, a minor force may cause one both of the wires 12 to disconnect from the connectors 14. This can cause the component 10 to stop functioning, which can reduce the uptime of a computer associated with the component 10.

Accordingly, there is a need for securing connections between wires and components within computers. Aspects of the present disclosure solve this and other problems.

SUMMARY

According to one embodiment, a system is disclosed that is configured to secure a connection between a component and at least one wire within a computer. The system includes a retainer. The retainer is configured to move between a first position and a second position. The retainer in the first position is configured to secure a connection between at least one connector of the component and the at least one wire within the computer. The retainer in the second position is configured to permit disconnection of the connection between the at least one connector of the component and the at least one wire within the computer.

According to a further aspect, the retainer is configured to translate toward and away from the component, generally within a plane of the component, to move between the first position and the second position. According to a further aspect, the retainer is configured to slide vertically toward and away from the component as the retainer moves between the first position and the second position. According to a further aspect, the retainer is configured to rotate between the first position and the second position. According to a further aspect, the first position includes the retainer in a horizontal position, parallel to a plane of the component, and the second position includes the retainer in a vertical position, perpendicular to the plane of the component. According to a further aspect, the system includes a frame that is configured to hold the component within the computer. The system further includes a support coupled to the frame. The support is configured to hold the retainer such that the retainer can move between the first position and the second position. According to a further aspect, the retainer cooperates with at least one of the support, the frame, or the component to lock in the first position. According to a further aspect, the retainer and the support include a detent and a corresponding recess configured to accept the detent for locking the retainer in the first position. According to a further aspect, the retainer includes the detent and the support includes the recess. According to a further aspect, the retainer includes a recess configured to accept a portion of the support. According to a further aspect, the portion of the support is configured to fit in the recess to form an interference fit to lock the retainer in the first position. According to a further aspect, the retainer includes a first section configured to cooperate with the support so that the retainer moves up and down between the first position and the second position as the retainer slides between the first position and the second position. According to a further aspect, the support includes a portion configured to cooperate with the first section of the retainer so that the retainer moves vertically up and down between the first position and the second position as the retainer slides. According to a further aspect, the retainer includes a second section that is parallel to a plane of the component with the retainer in the first position. According to a further aspect, the retainer includes two slots, the support includes two pegs, and the two pegs are configured to cooperate with the two slots to guide the retainer relative to the support between the first position and the second position. According to a further aspect, the support includes a recess configured so that the support surrounds the at least one wire on three sides with the at least one wire within the recess. According to a further aspect, the system includes a frame configured to hold the component within the computer and at least one post upon which the component sits when the component is held by the frame. The system further includes at least one screw configured to interface with the at least one post through the retainer so as to releasably couple the retainer to the component. According to a further aspect, the at least one post is at least two posts, and the at least one screw is at least two screws. Each screw of the at least two screws is configured to interface with a separate post of the at least two posts through the retainer so as to releasably couple the retainer to the component. According to a further aspect, the at least one wire is an antenna for wireless communications. According to a further aspect, the at least one connector releasably connects to the at least one wire based on an interference fit.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of embodiments together with reference to the accompanying drawings. These drawings depict only embodiments and are, therefore, not to be considered as limitations on the scope of the various embodiments or claims.

DETAILED DESCRIPTION

The various embodiments are described with reference to the attached figures, where like reference numerals are used throughout the figures to designate similar or equivalent elements. The figures are not drawn to scale, and they are provided merely to illustrate the instant invention. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
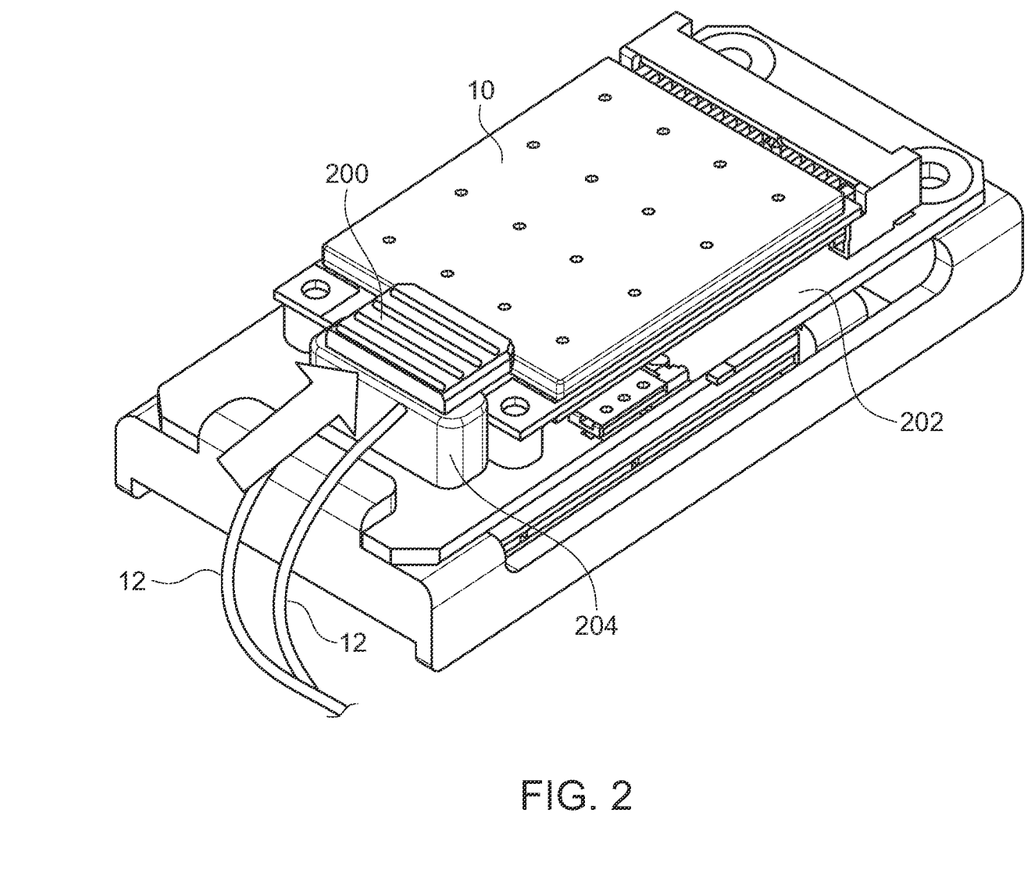
FIG. 2 is a perspective view depicting an arrangement of two wires being secured to a component within a computer by a retainer, according to aspects of the present disclosure.

FIG. 2 is a perspective view depicting a retainer 200 configured to secure a connection, according to aspects of the present disclosure. FIG. 2 includes the component 10 connected to two wires 12 from FIG. 1. The component 10 is mounted on a frame 202. The frame 202 can be any structure within a computer that is configured to hold the component 10, such as a portion of a computer chassis (not shown) and/or a feature (not shown) on the chassis specifically configured to hold the component 10. The two wires 12 connect to respective connectors (not shown) of the component 10, which are hidden by the retainer 200 in FIG. 2 but are similar to the connectors 14 in FIG. 1. However, unlike the arrangement in FIG. 1, the retainer 200 can secure the connection between the two wires 12 and the connectors 14. Thus, the retainer 200 can prevent or minimize forces that would otherwise cause a disconnection between the two wires 12 and the connectors 14.

The retainer 200 is configured to move between a first position, generally shown in FIG. 2, and a second position, described below and generally shown in FIG. 3. In the first position in FIG. 2, the retainer 200 is configured to secure the connection between the connectors 14 (hidden by retainer 200) and the wires 12. The retainer 200 covers the wires 12 and keeps the wires 12 connected to the connectors 14. The retainer 200 is configured to secure the connection by reducing or restricting a force that would otherwise act on the wires 12 to cause the wires 12 to disconnect from the connectors 14. Instead, the force can be absorbed or blocked by the retainer 200. Yet, when the wires 12 are intended to be disconnected from the connectors 14, the retainer 200 can be moved to the second position.

Figure 3:
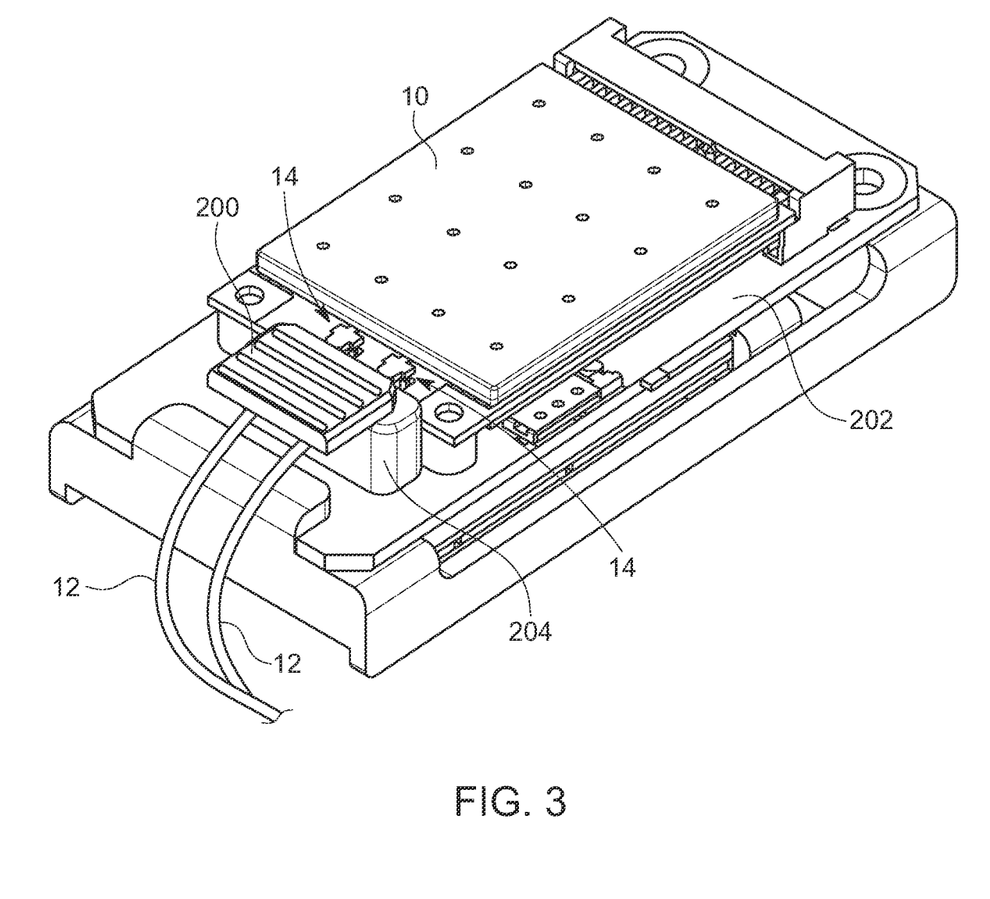
FIG. 3 is a perspective view depicting the retainer of FIG. 2 being disengaged from the component to allow for removal of the two wires from the component, according to aspects of the present disclosure.

FIG. 3 is a perspective view depicting the retainer 200 of FIG. 2 generally in the second position, according to aspects of the present disclosure. As shown, the retainer 200 is translated generally backwards, away from the component 10, along a plane generally defined by the frame 202. The retainer 200 translated backwards reveals the wires 12 connected to the connectors 14. Once the connectors 14 are exposed, a user can manually disconnect the wires 12 from the connectors 14. For example, the user can overcome the force of an interference fit between the wires 12 and the connectors 14 to disconnect the wires 12, by acting directly on the wires 12 and/or connectors 14.

Although the connection is generally described as being between the connectors 14 and the wires 12 at the component 10, in one or more embodiments, the component 10 can include the wires 12 (which, for example, can be permanently attached to the component 10) and the connectors 14 can be on the frame 202 and/or another feature of the computer (not shown). The retainer 200 can then instead secure the connection between the wires 12 and the connectors 14 at the frame 202 and/or other feature of the computer (not shown), rather than at the component 10.

In one or more embodiments, the retainer 200 can cooperate entirely with the component 10 to translate between the first position (FIG. 2) and the second position (FIG. 3). For example, the retainer 200 can be coupled to the component 10 so that the retainer 200 can translate between the first position (FIG. 2) and second position (FIG. 3).

Alternatively, and as shown in FIGS. 2 and 3, in one or more embodiments, the frame 202 can include a support 204 that is attached or coupled to the frame 202. The retainer 200 can instead cooperate entirely with the support 204 to translate between the first position (FIG. 2) and the second position (FIG. 3). In such an arrangement, the retainer 200 may not contact the component 10 when in the first and/or second positions. However, alternatively, in one or more embodiments, the retainer 200 can cooperate with both the component 10 and the support 204 to translate between the first position (FIG. 2) and the second position (FIG. 3).

Further, in one or more embodiments, the retainer 200 can be configured to lock into one or both of the first position and the second position. For example, a force greater than the force required to translate the retainer 200 between the first and second positions may be required to first unlock the retainer 200 to allow the retainer 200 to move between the first and second positions. Various configurations allow for the retainer 200 to lock into position, such as the retainer 200 forming an interference fit with one or both of the component 10 and the support 204 in the first position. Such locking assists the retainer 200 in preventing an unintended disconnection of the wires 12 from the connectors 14, by preventing an unintended movement of the retainer 200 from the first position (FIG. 2) to the second position (FIG. 3).

Figure 4:
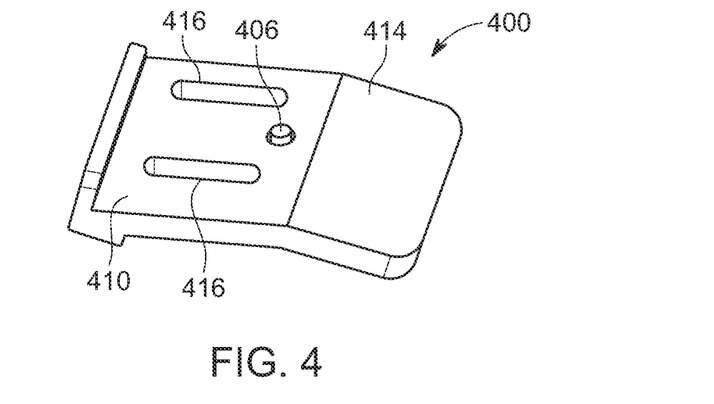
FIG. 4 is a perspective view depicting a bottom side of a retainer, according to aspects of the present disclosure.
Figure 5:
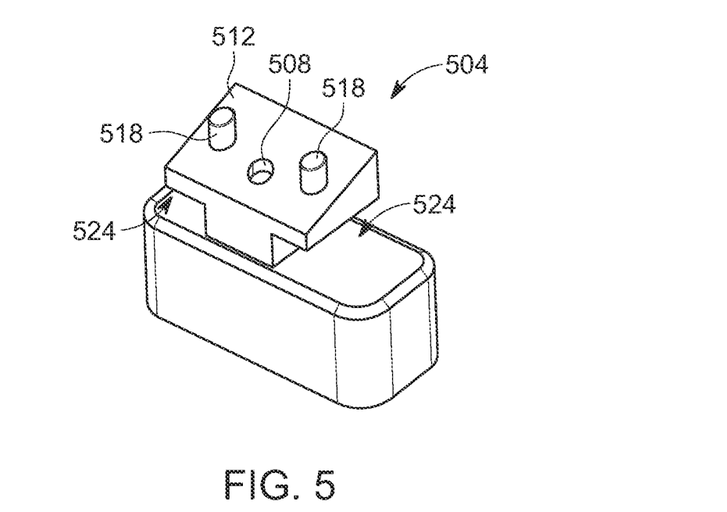
FIG. 5 is a perspective view depicting a support, according to aspects of the present disclosure.

FIG. 4 is a perspective view depicting a bottom side of another retainer 400, according to aspects of the present disclosure. Similarly, FIG. 5 is a perspective view depicting another support 504, according to aspects of the present disclosure. In FIG. 4, the retainer 400 is similar to the retainer 200 except for several differences. According to one difference, the retainer 400 includes a detent 406. The detent 406 cooperates with a recess 508 (FIG. 5) in the support 504. The detent 406 is located on the retainer 400 so that the detent 406 fits within the recess 508 in the support 504 when the retainer 400 is in a position that secures a connection (discussed below) and resists the retainer 400 from moving relative to the support 504. Thus, the detent 406 forms an interference fit with the recess 508. In one or more alternative embodiments, the retainer 400 can instead include the recess 508 and the support 504 can instead include the detent 406. Further, in one or more embodiments, there can be more than one pair of detent 406 and recess 508.

According to another difference, in one or more embodiments, the retainer 400 and the support 504 can include a section 410 and a portion 512, respectively, configured to cooperate together so that the retainer 400 vertically moves up and down between the first position (securing a connection) and the second position as the retainer 400 horizontally moves between the first position and the second position. For example, the portion 512 of the support 504 can be angled relative to the plane of a frame on which the component 10 is coupled so that the retainer 400 moves up and down relative to the plane between the first and second positions, as discussed below for FIGS. 6A through 7B. This up and down movement further brings the retainer 400 towards and away from the component 10.

According to another difference, in addition to the section 410, the retainer 400 can include a second section 414. The second section 414 is configured to be generally parallel to a frame on which the component 10 sits, as discussed below for FIGS. 6A through 7B. The second section 414 being parallel provides a larger surface area that contacts the wires 12 to keep the wires connected to the connectors 14, while the retainer 400 secures a connection.

According to another difference, in one or more embodiments, the retainer 400 can include at least two slots 416 (FIG. 4) that cooperate with at least two pegs 518 (FIG. 5) on the support 504. The slots 416 and the pegs 518 guide the retainer 400 between the first and second positions. Although the slots 416 are illustrated in FIG. 4 as being formed by an opening that extends entirely through the retainer 400, in one or more embodiments, the slots 416 can instead extend only partially into the retainer 400. Further, although the slots 416 are shown on the bottom of the retainer 400, the slots can instead be on the sides of the retainer 400 or have other configurations that cooperate with a support, as discussed below in FIGS. 6A through 7B.

As illustrated in FIG. 5, the support 504 can includes recesses 524 that accept wires (not shown) so that the support 504 surrounds the wires on three sides with the wires extending through the recesses 524. In one or more embodiments, a recess 524 in combination with the retainer 400 can further retain a wire and limit or restrict a force applied to a wire before the point where the wire connects to a connector. This further reduces a force that is applied to a wire at a connector so as to reduce further a likelihood that the wire disconnects from a connector in response to an applied force.

Figure 6A:
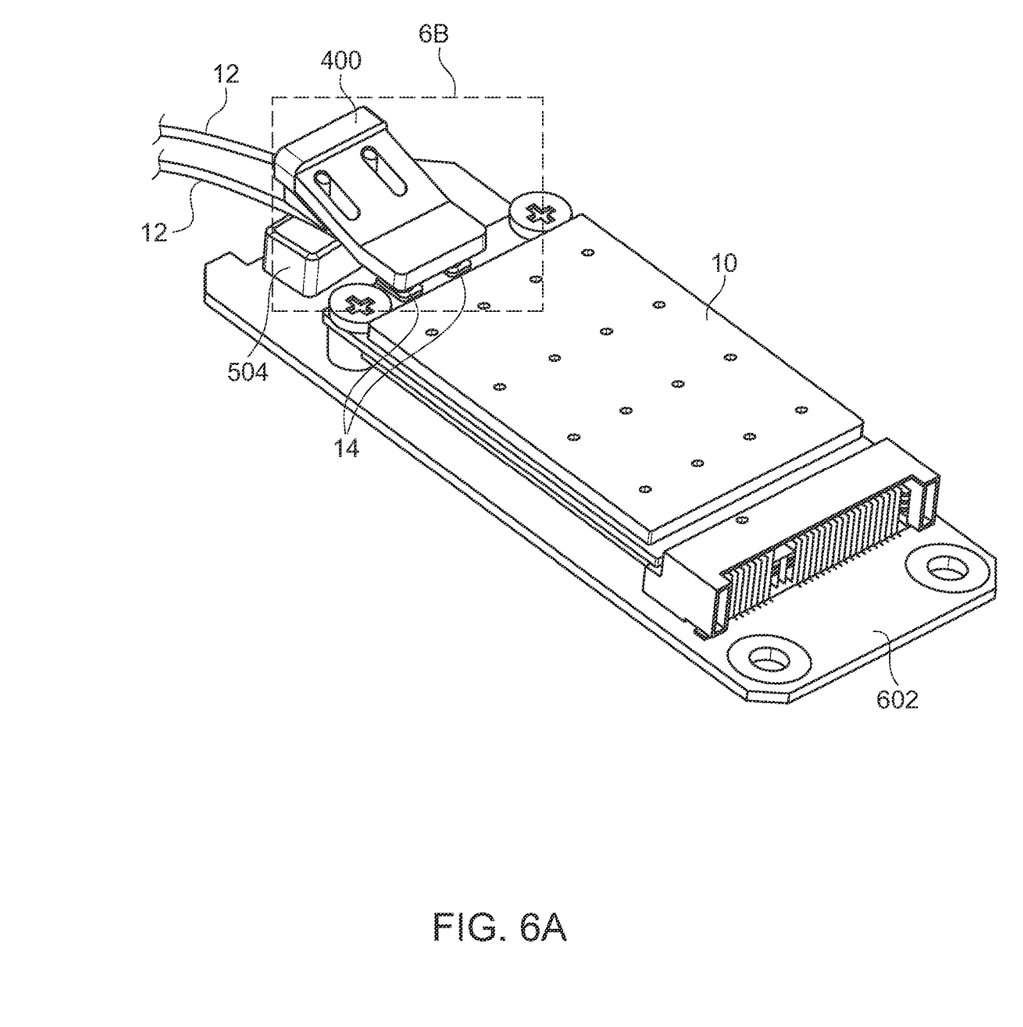
FIG. 6A is a perspective view depicting an arrangement of two wires being secured to a component within a computer by a retainer, according to aspects of the present disclosure.
Figure 6B:
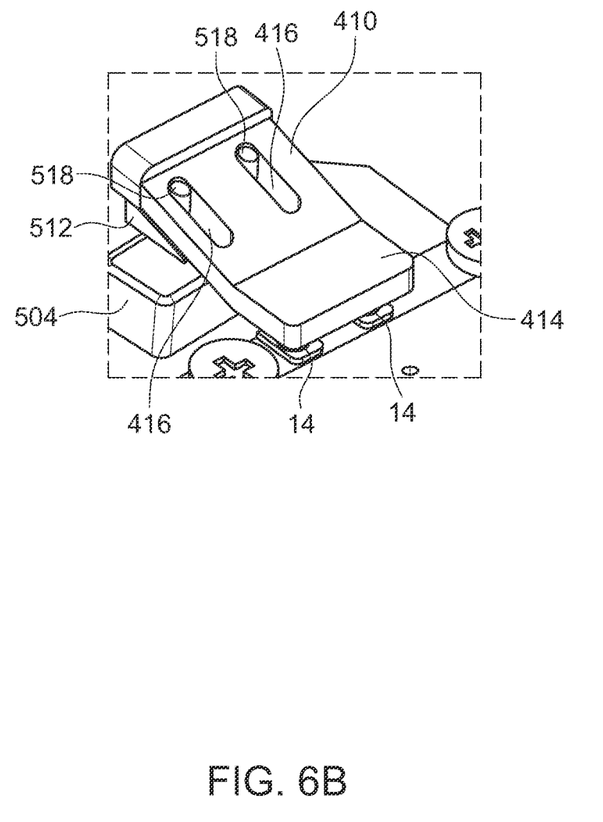
FIG. 6B is a detailed perspective portion of the view in FIG. 6A depicting an arrangement of two wires being secured to a component within a computer by a retainer, according to aspects of the present disclosure.
Figure 7A:
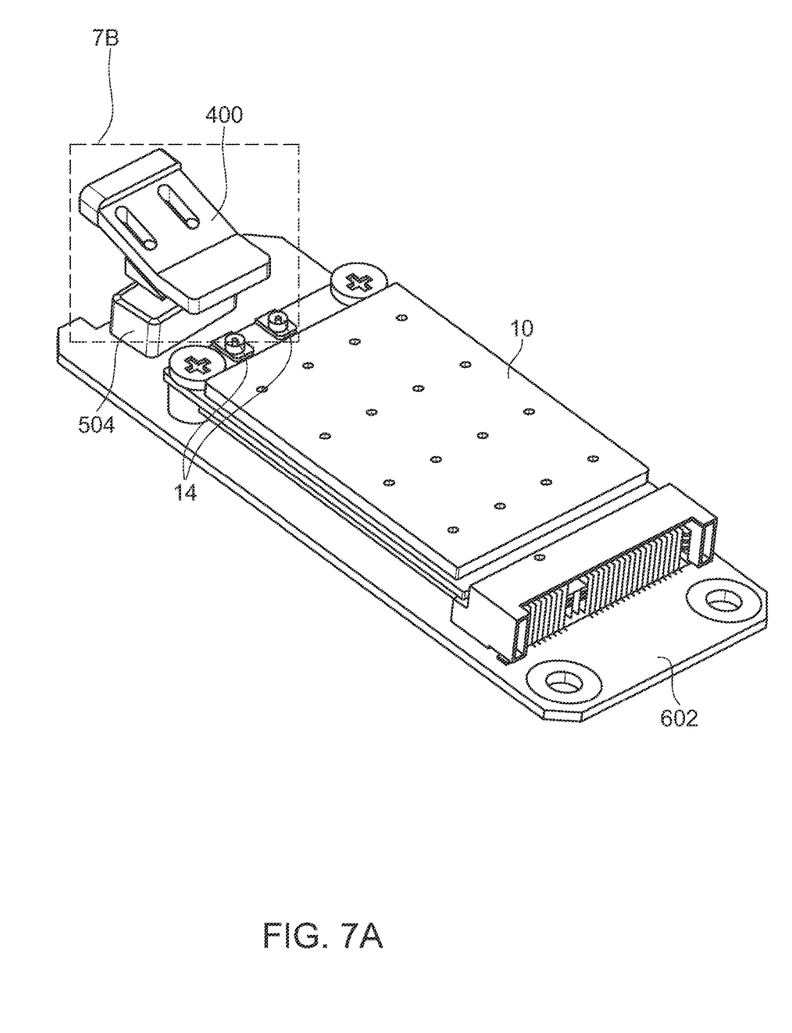
FIG. 7A is a perspective view depicting the retainer of FIG. 6A disengaged from the component to allow for removal of the two wires from the component, according to aspects of the present disclosure.
Figure 7B:
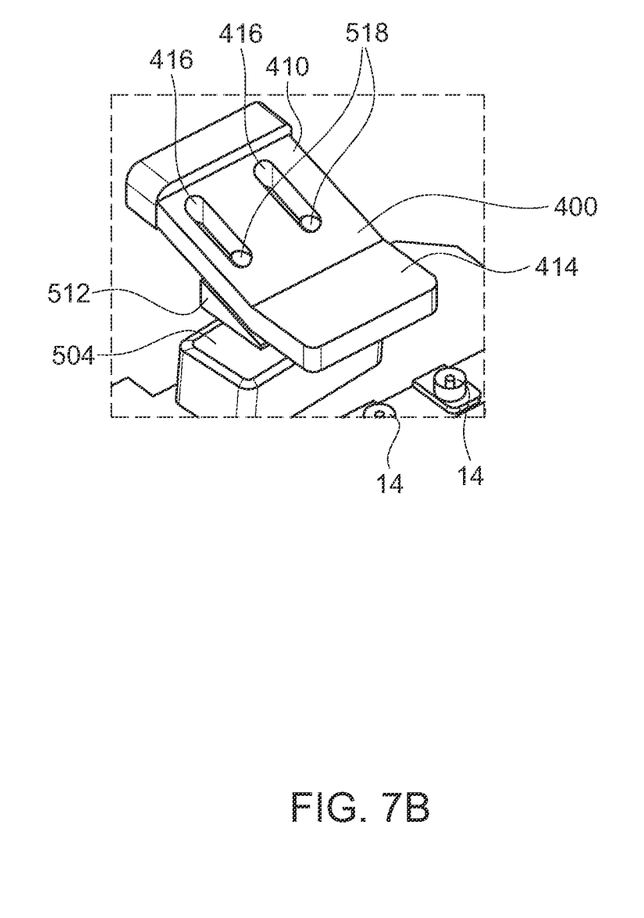
FIG. 7B is a detailed perspective portion of the view in FIG. 7A depicting an arrangement of two wires being secured to a component within a computer by a retainer, according to aspects of the present disclosure.

FIGS. 6A and 6B are perspective views depicting an arrangement of two wires 12 being maintained fastened to a component 10 within a computer by the retainer 400 of FIG. 4, according to aspects of the present disclosure. FIGS. 6A and 6B includes the component 10 connected to two wires 12. The component 10 is mounted on a frame 602 similar or identical to the frame 202 in FIG. 2. Thus, the frame 602 can be any structure within a computer (not shown) that is configured to hold the component 10 within or on the computer. The two wires 12 can be an antenna within the computer and connect to respective connectors 14 of the component 10, which are hidden by the retainer 400 in FIGS. 6A and 6B, but are similar to what is shown in FIGS. 1 and 3. FIGS. 7A and 7B are perspective views depicting the retainer 400 disengaged from the component 10 to allow for removal of the two wires 12 from the component 10, according to aspects of the present disclosure.

The retainer 400 is configured to move between a first position, generally shown in FIG. 6A, and a second position, described below and generally shown in FIG. 7A. In the first position in FIG. 6A, the retainer 400 is configured to secure a connection between the connectors 14 (hidden by retainer 400) and the wires 12. The retainer 400 covers the wires 12 and keeps the wires 12 connected to the connectors 14. More specifically, and as shown in the detailed view in FIG. 6B, the second section 414 of the retainer 400 is generally parallel to a plane defined by the frame 602 that holds the component 10. The second section 414 is configured to contact the wires 12 where they contact the connectors 14 to secure the connection by reducing or restricting a force that would otherwise act on the wires 12 to cause the wires 12 to disconnect from the connectors 14. Instead, the force can be absorbed or blocked by the second section 414 of the retainer 400, or the retainer 400 as a whole. Yet when the wires 12 are intended to be disconnected from the connectors 14, the retainer 400 can be moved to the second position shown in FIG. 7A As shown in FIGS. 7A and 7B, the retainer 400 translates backwards and upwards, away from the component 10 revealing the wires 12 connected to the connectors 14. As shown in the detailed portion of FIG. 7B, the retainer 400 moves vertically upwards as it moves backwards because the angled portion 512 of the support 504 cooperates with the angled section 410 of the retainer 400 relative to the flat second section 414. Further, the pegs 518 in the support 504 cooperate with the slots 416 in the retainer 400 to guide the retainer 400 between the first position (FIG. 6A) and the second position (FIG. 7A). Once the connectors 14 are exposed, a user can manually disconnect the wires 12 from the connectors 14.

Figure 8:
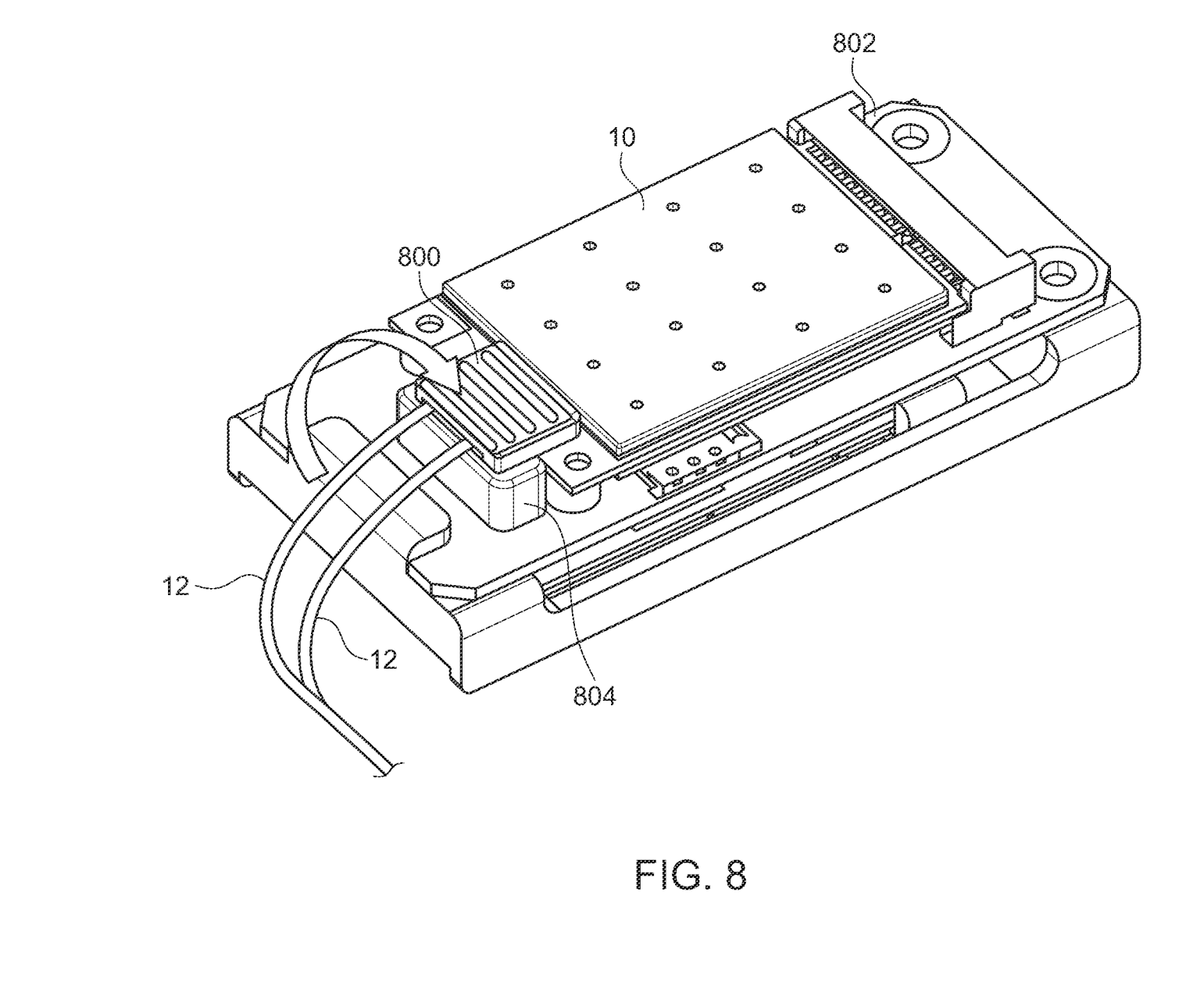
FIG. 8 is a perspective view depicting an alternative arrangement of two wires being secured to a component within a computer by a retainer, according to aspects of the present disclosure.

FIG. 8 is a perspective view depicting another retainer 800 configured to secure a connection, according to aspects of the present disclosure. FIG. 8 includes the component 10 connected to two wires 12. The component 10 is mounted on a frame 802 similar or identical to the frame 202 in FIG. 2. Thus, the frame 802 can be any structure within a computer (not shown) that is configured to hold the component 10 within or on the computer. The two wires 12 can be an antenna within the computer and connect to respective connectors 14 of the component 10, which are hidden by the retainer 800 in FIG. 8 but are similar to what is shown in FIGS. 1 and 3.

Figure 9:
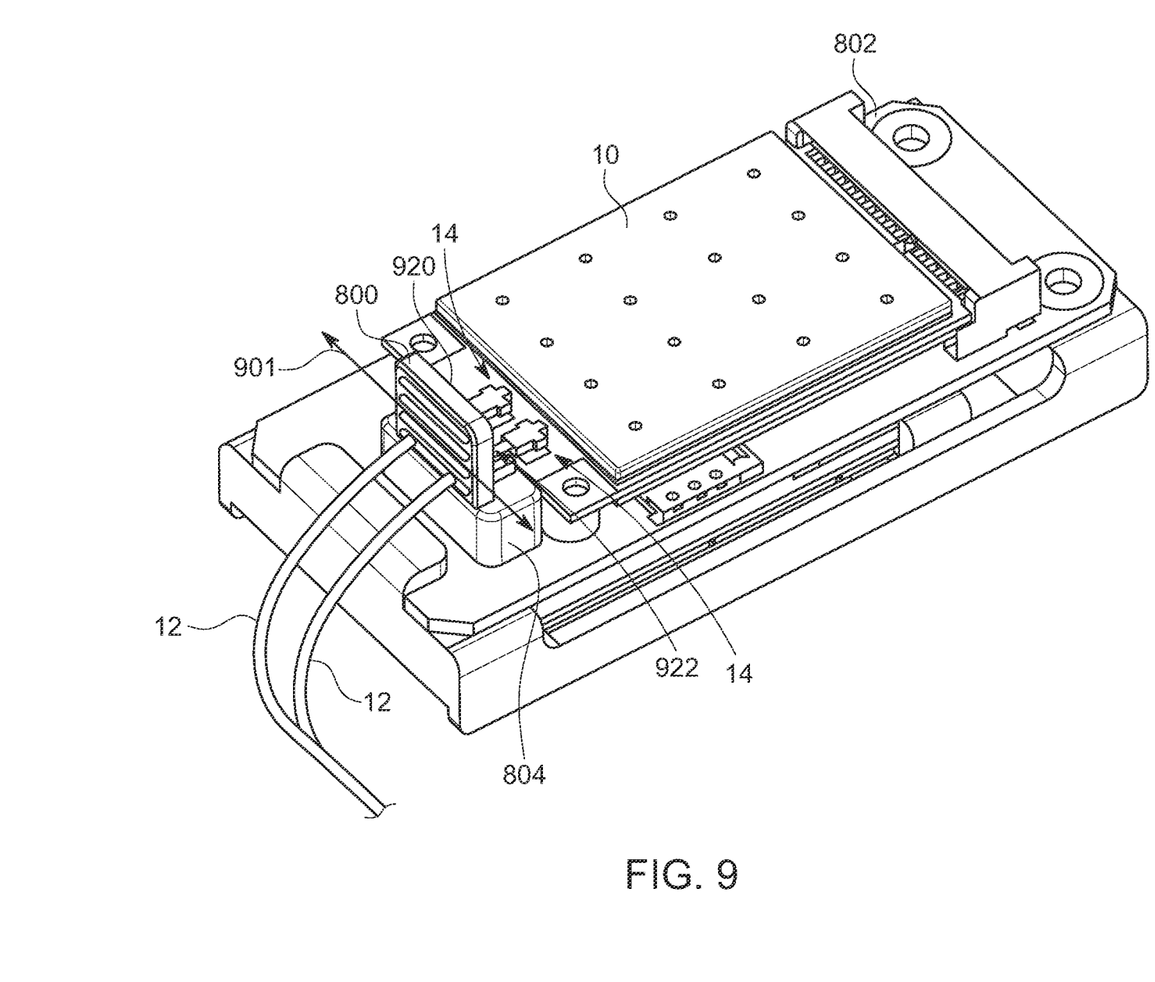
FIG. 9 is a perspective view depicting the retainer of FIG. 8 being disengaged from the component to allow for removal of the two wires from the component, according to aspects of the present disclosure.

The retainer 800 is configured to move between a first position, generally shown in FIG. 8, and a second position, described below and generally shown in FIG. 9. In the first position in FIG. 8, the retainer 800 is configured to secure a connection between the connectors 14 (not shown) and the wires 12. The retainer 800 covers the wires 12 and keeps the wires 12 connected to the connectors 14 (not shown). Similar to the retainer 200, the retainer 800 is configured to secure a connection by reducing or restricting a force that would otherwise act on the wires 12 to cause the wires 12 to disconnect from the connectors 14 (FIG. 9). Instead, the force can be absorbed or blocked by the retainer 800. Yet, when the wires 12 are intended to be disconnected from the connectors 14, the retainer 800 can be moved to the second position (FIG. 9).

The frame 802 includes a support 804 that is attached or coupled to the frame 802. The retainer 800 can cooperate entirely with the support 804 to rotate between the first position (FIG. 8) and the second position (FIG. 9). In such an arrangement, the retainer 800 may not contact the component 10 when at rest in the first and second positions.

FIG. 9 is a perspective view depicting the retainer 800 of FIG. 8 in the second position, according to aspects of the present disclosure. As shown, the retainer 800 rotates generally 90° counter-clockwise relative to the component 10 along an axis of rotation 901 that is generally perpendicular to a plane defined by the component 10, revealing the wires 12 connected to the connectors 14. Once the connectors 14 are exposed, a user can manually disconnect the wires 12 from the connectors 14. Although the retainer 800 is disclosed as rotating generally 90° counter-clockwise, the retainer 800 can rotate more or less as long as the retainer 800 in the second position provides access to the connectors 14 so as to disconnect the wires 12.

Further, in one or more embodiments, the retainer 800 can be configured to lock into one or both of the first position and the second position. For example, a force greater than the force required to rotate the retainer 800 between the first position (FIG. 8) and the second position (FIG. 9) may be required to first unlock the retainer 800 to allow the retainer 800 to move between the first and second positions. Various configurations allow for the retainer 800 to lock into position, such as the retainer 800 forming an interference fit with one or both of the component 10 and the support 804 in the first position. Locking the retainer 800 reduces the chance of an unintended disconnection of the wires 12 from the connectors 14. For example, in one or more embodiments, the retainer 200 can includes a recess 920 (FIG. 9) that is configured to accept a portion 922 of the support 804. The portion 922 of the support 804 is configured to fit in the recess 920 to form an interference fit to lock the retainer 800 in the first position. However, in one or more embodiments, the portion 922 can instead be on the retainer 800 and the recess 920 can instead be on the support 804.

Figure 10:
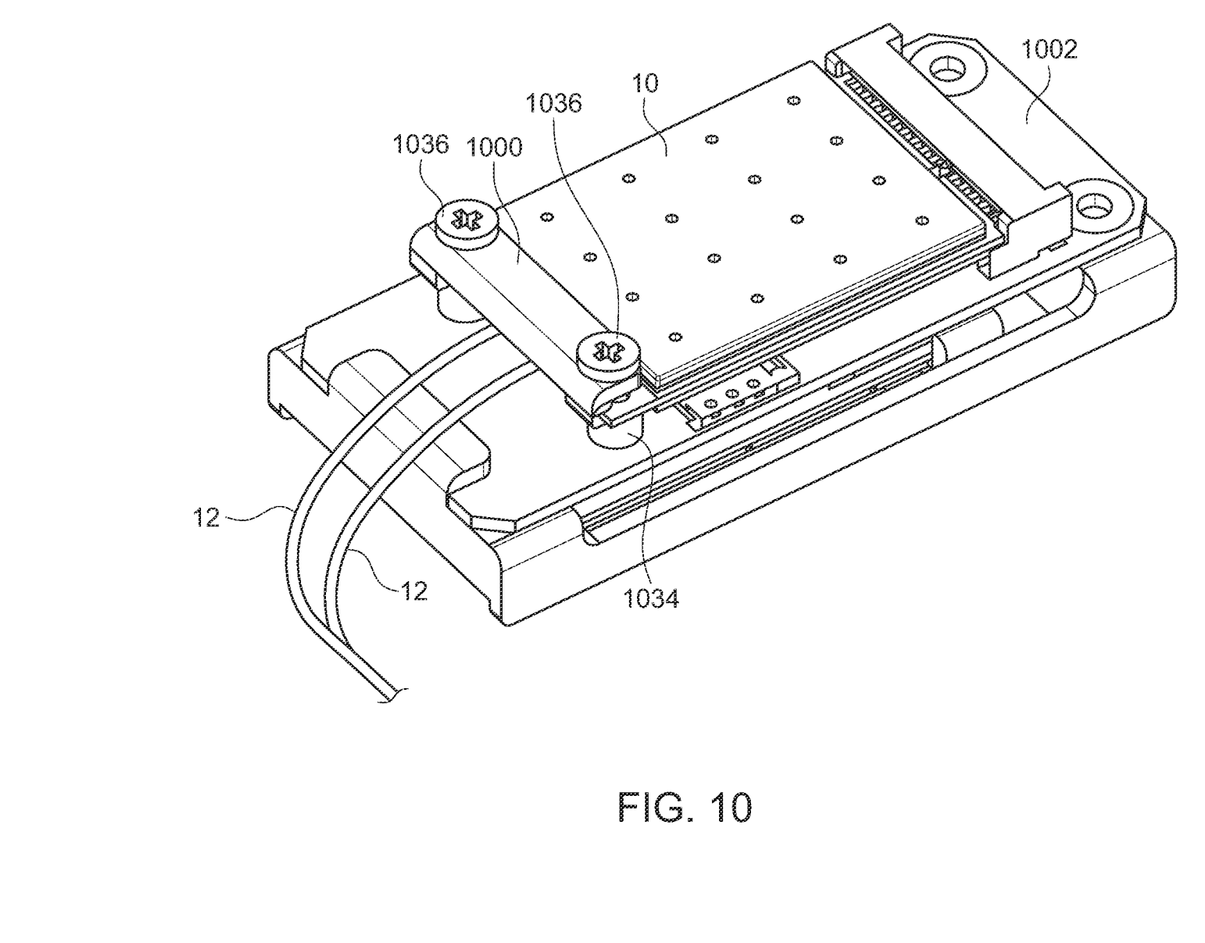
FIG. 10 is a perspective view depicting another arrangement of two wires being secured to a component within a computer by a bracket, according to aspects of the present disclosure.

FIG. 10 is a perspective view depicting another arrangement of two wires 12 being secured to a component 10 by a retainer 1000 in the form of a bracket, according to aspects of the present disclosure. Similar to the frames 202 and 802 above, the frame 1002 is configured to hold the component 10 so that the component 10 is releasably coupled to the frame 1002. The frame 1002 includes posts 1034 upon which the component 10 sits when the component 10 is held by the frame 1002. Screws 1036 are configured to interface with the posts 1034 through the retainer 1000 so as to releasably couple the retainer 1000 to the component 10. The retainer 1000 is configured to secure the wires 12 in connection with the connectors 14 (not shown; below retainer 1000) of the component 10 by contacting the wires 12 at the point of connection with the connectors 14. Although illustrated as two pairs of posts 1034 and screws 1036, in one or more embodiments, there can be one or more than two posts 1034 and screws 1036, such as three, four, or more pairs. In one or more embodiments, not every pair of post 1034 and screw 1036 needs to fasten the retainer 1000.

Figure 11:
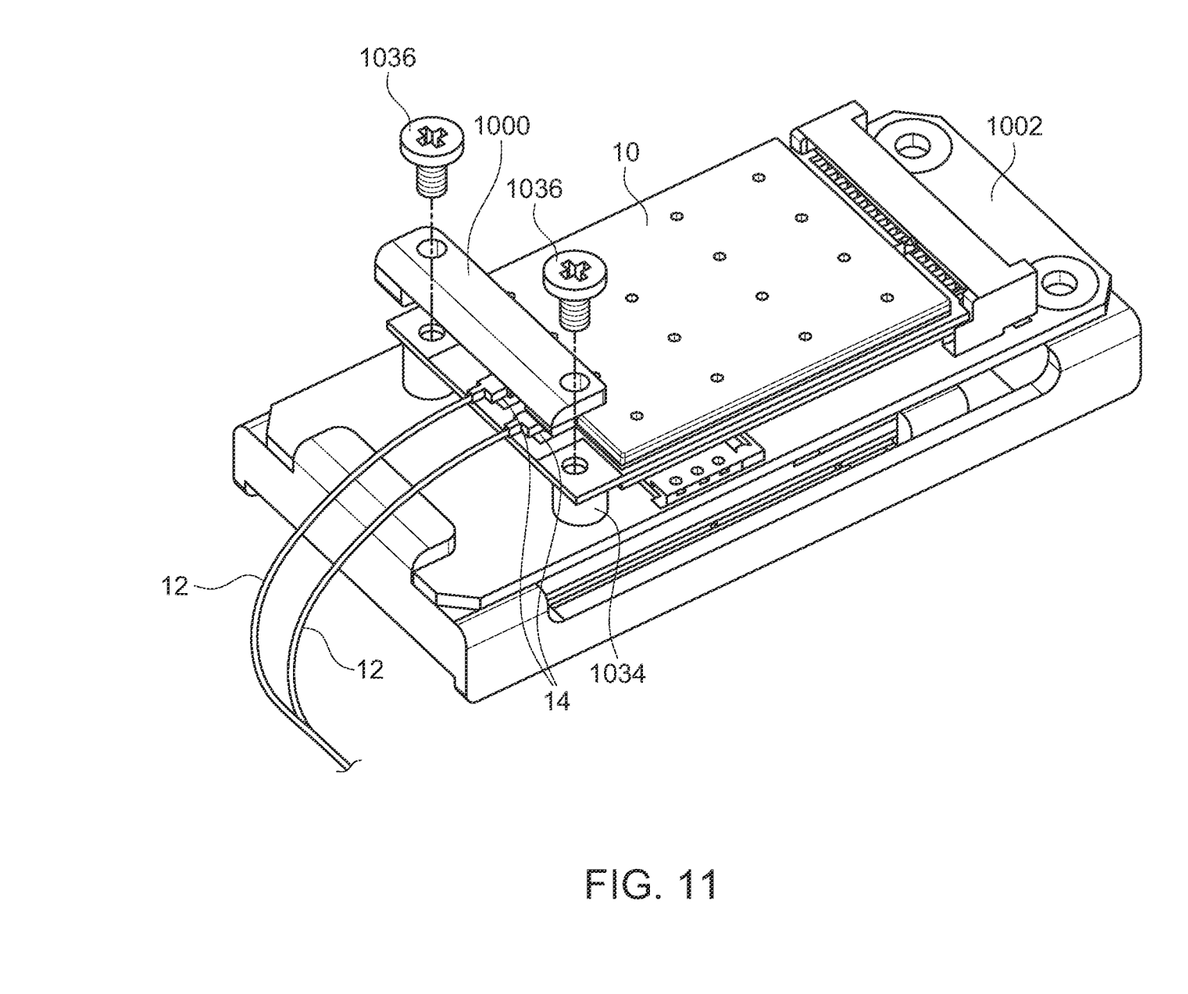
FIG. 11 is a perspective view depicting the bracket of FIG. 10 being disengaged from the component to allow for removal of the two wires from the component, according to aspects of the present disclosure.

FIG. 11 is a perspective view depicting the retainer 1000 of FIG. 10 being disengaged from the component 10 to allow for removal of the two wires 12 from the connectors 14 of the component 10, according to aspects of the present disclosure. The screws 1036 can be removed from the posts 1034, which then frees the retainer 1000 to be removed from the component 10. This provides access to disconnect the wires 12 from the connectors 14 of the component 10.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system configured to secure a connection between a component and at least one wire within a computer, the system comprising:
    a retainer configured to move between a first position and a second position, the retainer in the first position is configured to secure a connection between at least one connector of the component and the at least one wire within the computer, and the retainer in the second position is configured to permit release of the connection between the at least one connector of the component and the at least one wire within the computer;
    a frame configured to hold the component within the computer; and
    a support coupled to the frame and configured to hold the retainer such that the retainer can move between the first position and the second position,
    wherein the retainer includes a first section configured to cooperate with the support so that the retainer moves up and down between the first position and the second position as the retainer slides between the first position and the second position.

2. The system of claim 1, wherein the retainer is configured to translate toward and away from the component, generally parallel to a plane of the component, to move between the first position and the second position.

3. The system of claim 1, wherein the retainer is configured to slide vertically toward and away from the component as the retainer moves between the first position and the second position.

4. The system of claim 1, wherein the retainer cooperates with at least one of the support, the frame, or the component to lock in the first position.

5. The system of claim 4, wherein the retainer and the support include a detent and a corresponding recess configured to accept the detent for locking the retainer in the first position.

6. The system of claim 5, wherein the retainer includes the detent and the support includes the recess.

7. The system of claim 4, wherein the retainer includes a recess configured to accept a portion of the support.

8. The system of claim 7, wherein the portion of the support is configured to fit in the recess to form an interference fit to lock the retainer in the first position.

9. The system of claim 1, wherein the support includes a portion configured to cooperate with the first section of the retainer so that the retainer moves vertically up and down between the first position and the second position as the retainer slides.

10. The system of claim 1, wherein the retainer includes a second section that is parallel to a plane of the component with the retainer in the first position.

11. The system of claim 1, wherein the retainer includes two slots, the support includes two pegs, and the two pegs are configured to cooperate with the two slots to guide the retainer relative to the support between the first position and the second position.

12. The system of claim 1, wherein the support includes a recess configured so that the support surrounds the at least one wire on three sides with the at least one wire within the recess.

13. The system of claim 1, wherein the at least one wire is an antenna for wireless communications.

14. The system of claim 1, wherein the at least one connector releasably connects to the at least one wire based on an interference fit.

15. A system configured to secure a connection between a component and at least one wire within a computer, the system comprising:
    a retainer configured to move between a first position and a second position, the retainer in the first position is configured to secure a connection between at least one connector of the component and the at least one wire within the computer, and the retainer in the second position is configured to permit release of the connection between the at least one connector of the component and the at least one wire within the computer;
    a frame configured to hold the component within the computer; and
    a support coupled to the frame and configured to hold the retainer such that the retainer can move between the first position and the second position,
    wherein the retainer includes two slots, the support includes two pegs, and the two pegs are configured to cooperate with the two slots to guide the retainer relative to the support between the first position and the second position.

16. The system of claim 15, wherein the retainer is configured to translate toward and away from the component, generally parallel to a plane of the component, to move between the first position and the second position.

17. The system of claim 15, wherein the retainer is configured to slide vertically toward and away from the component as the retainer moves between the first position and the second position.

18. The system of claim 15, wherein the retainer cooperates with at least one of the support, the frame, or the component to lock in the first position.

19. The system of claim 18, wherein the retainer and the support include a detent and a corresponding recess configured to accept the detent for locking the retainer in the first position.

20. The system of claim 19, wherein the retainer includes the detent and the support includes the recess.

21. The system of claim 18, wherein the retainer includes a recess configured to accept a portion of the support.

22. The system of claim 21, wherein the portion of the support is configured to fit in the recess to form an interference fit to lock the retainer in the first position.

23. The system of claim 15, wherein the support includes a portion configured to cooperate with the first section of the retainer so that the retainer moves vertically up and down between the first position and the second position as the retainer slides.

24. The system of claim 15, wherein the retainer includes a second section that is parallel to a plane of the component with the retainer in the first position.

25. The system of claim 15, wherein the support includes a recess configured so that the support surrounds the at least one wire on three sides with the at least one wire within the recess.

26. The system of claim 15, wherein the at least one wire is an antenna for wireless communications.

27. The system of claim 15, wherein the at least one connector releasably connects to the at least one wire based on an interference fit.

* * * * *